E. J. FORBES.
REPAIR PATCH.
APPLICATION FILED OCT. 13, 1920.
1,414,733. Patented May 2, 1922.
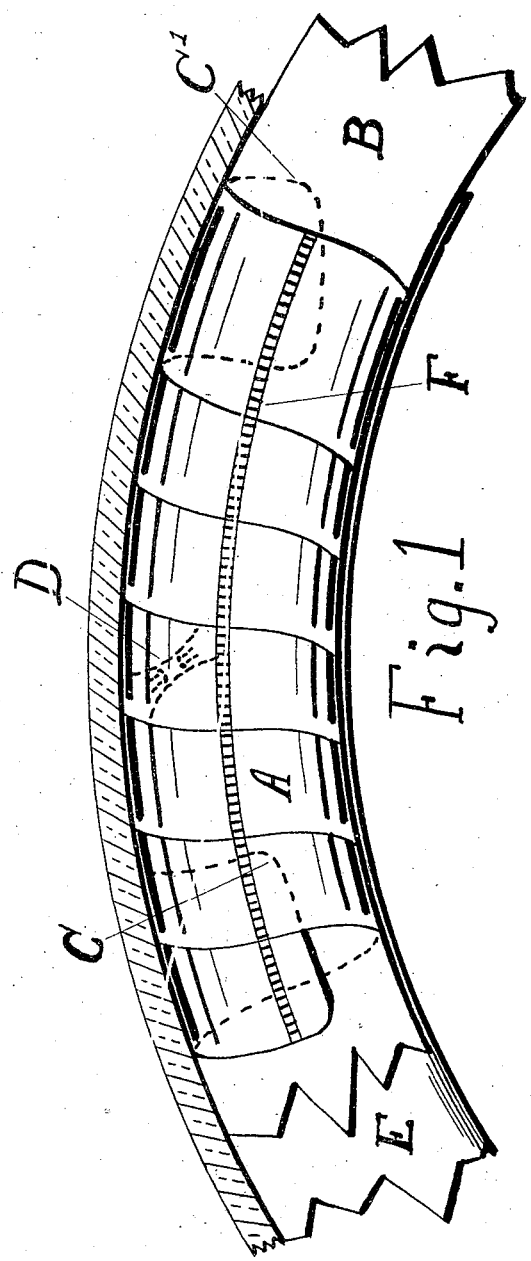
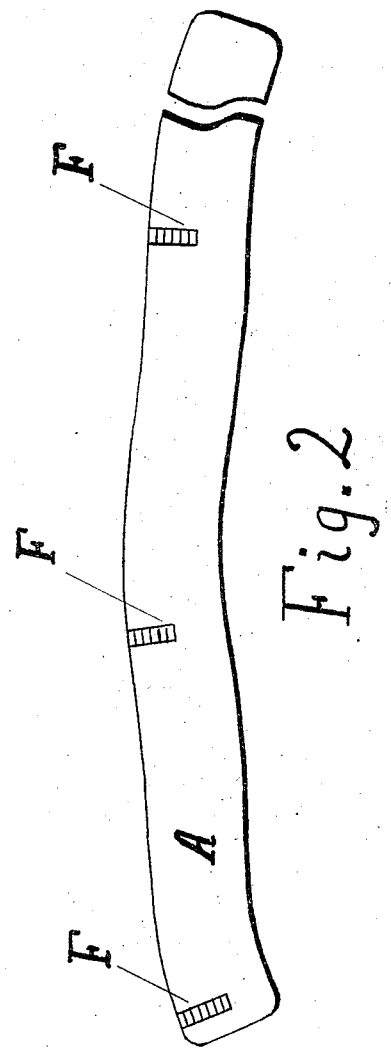

UNITED STATES PATENT OFFICE.

ELBRIDGE J. FORBES, OF REVERE, MASSACHUSETTS.

REPAIR PATCH.

1,414,733. Specification of Letters Patent. Patented May 2, 1922.

Application filed October 13, 1920. Serial No. 416,619.

*To all whom it may concern:*

Be it known that I, ELBRIDGE J. FORBES, a citizen of the United States, residing at Revere, in the county of Suffolk and State of Massachusetts, have invented a new and useful Repair Patch, of which the following is a specification.

My invention relates to improvements in repair patches for pneumatic vehicle tires which have blown out, been cut, or become weakened in some part.

The objects of my invention are, (1) to provide a repair patch that will enable a damaged casing to give good service until it is worn out by use, (2) to provide a repair patch that by reason of its construction will adjust itself perfectly to the original size and shape of the casing and preserve said size and shape when inflated and in use; (3) to provide a repair patch which is entirely out of sight with no projecting ends or visible parts when in use; (4) to provide a repair patch which will occupy but a small space when rolled or packed for transportation.

I attain these objects by the means illustrated in the accompanying drawing, in which—

Figure 1 is a view showing the repair patch in position as in use with a section of casing and a section of inner tube to show their relation. Figure 2 is a view on reduced scale of the repair patch flattened out to show approximately the shape and markings provided to conform smoothly and conveniently with its curved tubular form when in use.

Similar letters refer to similar parts throughout the several views.

The reference-letter A designates the repair patch which may be made of fabric or other suitable flexible material and may be of several plys or thicknesses, cemented or vulcanized together with rubber or other suitable adhesive or material, so that sufficient strength may be obtained and at the same time the edges be thin to obviate the possibility of cutting or wearing through the inner tube B when long in use. The repair patch should be of such width that when it is coiled about the inner tube in position for use, the edge of each coil overlaps the previous coil approximately as shown by dotted line C which represents the covered edge of the first coil—each succeeding coil being arranged in similar manner. The repair patch may be of any necessary length and number of coils between the ends C and $C^1$ according to the size of the defect represented by dotted line D in the casing E which it is to cover, as long as a sufficient number of coils are on each side of the defect to hold to the parts of the casing which are still of normal strength.

One or more stripes of some distinguishable color may be placed on the repair patch when, in process of preparation it is formed up in the proper size and shape, so that when it is put in use it may be readily re-coiled in the correct position as shown by the stripe F in Fig. 1—F in Fig. 2 showing the parts of said stripe as they appear when repair patch is uncoiled.

When the repair patch is to be put in use, it should be coiled about the inner tube, which may for convenience be inflated to slightly less than the inside diameter of the casing, so that the sections of the colored portion F will match approximately with each other, insuring the correct position of the repair patch as shown in Fig. 1, and the outside circumference of the repair patch as coiled will be slightly less than the inside circumference of the casing; then the inner tube with the repair patch wrapped around it should be placed in the casing in such a position that the defect in the casing will be approximately in the middle of the repair patch. When the tire is inflated, the repair patch uncoils slightly till the increased diameter fills the space in the casing to the size of the uninjured part where the friction or adhesion between the parts in contact hold it.

While I have illustrated and described a particular form in which my invention may be embodied, it will be readily understood that it can be carried out in many other ways within the scope of the claims.

Having thus described my invention, I claim as new and desire to secure by Letters Patent—

1. A single piece repair patch or blow out bridge for pneumatic vehicle tires which, when in use, is coiled spirally around the inner tube and inside the casing with the several coils overlapping each other sufficiently to sustain the internal air pressure locally by means of the friction of the overlapping portions at each coil under the blow out or defect when, as the tire is inflated, the expansion of the inner tube clamps the end coils between its outer surface and the inner surface of the uninjured parts of the casing adjacent to the blow out or defect, thus avoiding an additional or excessive strain on any part of the casing.

2. A single piece repair patch or blow out bridge for pneumatic vehicle tires which, when in use, is coiled spirally around the inner tube and inside the casing, the apparently similar coils of which perform two distinct offices according to their position; the middle coils which are under the blow out or defect sustaining the air pressure by means of the friction of their overlapping surfaces while the coils near the ends serve as an adjustment stop only.

3. A single piece repair patch or blow out bridge for pneumatic vehicle tires which is, when in use, coiled around the inner tube inside the casing and which has marking of some distinguishable color to aid in placing it in the proper position for use.

ELBRIDGE J. FORBES.